United States Patent Office 2,742,395
Patented Apr. 17, 1956

2,742,395

PROCESS FOR ALLEVIATING HUMAN TOPICAL FUNGAL INFECTIONS WITH A BROMO NITRO ETHER

Edward B. Hodge and Grant J. Lafferty, Terre Haute, Ind., assignors to Commercial Solvents Corporation, Terre Haute, Ind., a corporation of Maryland No Drawing. Application August 4, 1953,
Serial No. 372,392

7 Claims. (Cl. 167—58)

Our invention relates to compositions useful as fungicides. More particularly our invention relates to fungicidal compositions containing as the active ingredient a bromo nitro ether having the formula

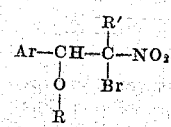

wherein Ar is a member selected from the group consisting of phenyl, chlorophenyl, methoxyphenyl, and dichlorophenyl, and R and R' are lower alkyl groups.

We have now discovered that fungicidal compositions containing the bromo nitro ethers described by the above formula are effective fungicides and that such compositions can be formulated in several different media for application. Our invention embraces the use of any of the bromo nitro ethers described above as the essential active ingredient of fungicidal compositions.

Bromo nitro ethers useful in our new fungicidal compositions include:

2-nitro-2-bromo-1-methoxy-1-phenylpropane
2-nitro-2-bromo-1-methoxy-1-phenylbutane
2-nitro-2-bromo-1-ethoxy-1-phenylpropane
2-nitro-2-bromo-1-methoxy-1-p-chlorophenylpropane
2-nitro-2-bromo-1-methoxy-1-o,p-dichlorophenylpropane
2-nitro-2-bromo-1-methoxy-1-o,p-dichlorophenylbutane
2-nitro-2-bromo-1-methoxy-1-p-chlorophenylpentane
2-nitro-2-bromo-1-methoxy-1-o-chlorophenylpropane
2-nitro-2-bromo-1-ethoxy-1-o-chlorophenylpropane
2-nitro-2-bromo-1-ethoxy-1-o-chlorophenylbutane
2-nitro-2-bromo-1-methoxy-1-o-chlorophenylbutane
2-nitro-2-bromo-1-methoxy-1-p-chlorophenylbutane
2-nitro-2-bromo-1-methoxy-1-m,p-dichlorophenylpropane
2-nitro-2-bromo-1-ethoxy-1-phenylbutane
2-nitro-2-bromo-1-methoxy-1-p-methoxyphenylpropane
2-nitro-2-bromo-1-methoxy-1-p-methoxyphenylbutane The bromo nitro ethers useful in our new fungicidal compositions are prepared by the procedure set forth in U. S. Patent 2,562,151 issued July 24, 1951, to Murray Senkus for "Halogenated Nitro Ethers." Those bromo nitro ethers listed above can be produced by varying the alcohol and nitroolefin employed as starting materials in the procedure set forth in the above-cited U. S. patent.

According to our invention, bromo nitro ethers having the formula

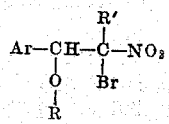

wherein Ar is a member selected from the group consisting of phenyl, chlorophenyl, methoxyphenyl, and dichlorophenyl; and R and R' are lower alkyl groups are associated with a pharmaceutical carrier which can be an ointment base, a lotion base, a suppository base, or a solid powder. Solid powdered compositions can be used as dusting powders or insufflation powders.

Our invention is illustrated by the following examples of suitable forms of our new fungicidal compositions, but we do not intend to be limited by the proportions or amounts set forth therein.

EXAMPLE I

A suitable fungicidal ointment composition consists of:

| | Grams |
|---|---|
| A. Stearic acid | 900 |
| B. Glycerin | 800 |
| C. Anhydrous lanolin | 80 |
| D. 2-amino-2-methyl-1-propanol | 40 |
| E. Distilled water | 2100 |
| F. 2-nitro-2-bromo-1-methoxy-1-phenylpropane | 40 |

Stearic acid, lanolin, and 2-nitro-2-bromo-1-methoxy-1-phenylpropane are melted together at about 70° C. The glycerin, 2-amino-2-methyl-1-propanol and water are mixed and heated to 70° C. then the latter mixture is added with stirring to the first melted mixture.

The above are carefully mixed and milled to avoid lumps and filled into 2 oz. jars. The composition contains 1% of the active fungicidal agent.

EXAMPLE II

Another suitable fungicidal ointment composition consists of:

| | Grams |
|---|---|
| A. Carbowax 4000 | 40 |
| B. Carbowax 1500 | 30 |
| C. Polyethylene glycol, 400 | 30 |
| D. 2-nitro-2-bromo-1-methoxy-1-phenylpropane | 1 |

This composition contains 1% of the active fungicidal agent.

EXAMPLE III

Another suitable fungicidal ointment composition consists of:

| | Percent |
|---|---|
| A. Petrolatum | 98 |
| B. 2-nitro-2-bromo-1-methoxy-1-phenylpropane | 2 |

The petrolatum was warmed to 60° and the 2-nitro-2-bromo-1-methoxy-1-phenylpropane was then dissolved. The mixture was stirred slowly until cool and filled into 2 oz. jars.

EXAMPLE IV

A suitable fungicidal dusting powder consists of:

| | Percent |
|---|---|
| A. Talc, U. S. P. | 98 |
| B. 2-nitro-2-bromo-1-methoxy-1-phenylpropane | 2 |

The two ingredients are ground together to a powder which passes a 200 mesh screen, and the powder is then filled into boxes.

EXAMPLE V

A suitable fungicidal vaginal insufflation powder consists of:

| | Percent |
|---|---|
| A. β-Lactose | 99 |
| B. 2-nitro-2-bromo-1-methoxy-1-phenylpropane | 1 |

The two ingredients are ground together to a powder which passes a 200 mesh screen, and the powder is filled into jars.

EXAMPLE VI

A suitable fungicidal topical lotion composition consists of:

A. Glyceryl monostearate _____ gms__ 22.5
B. Cetyl alcohol _____ gms__ 15.0
C. Stearic acid _____ gms__ 15.0
D. Triethanolamine _____ gms__ 2.55
E. Butyl-parasept _____ gm__ 0.2
F. Refined carrageen moss extract _____ gms__ 2.5
G. Distilled water to make 1000 ml.
H. Fritzsch bouquet _____ ml__ 0.8
I. 2 - bromo - 2 - nitro - 1 - methoxy - 1 - phenylpropane _____ gms__ 20

The glyceryl monostearate, cetyl alcohol, stearic acid, triethanolamine and 2-nitro-2-bromo-1-methoxy-1-phenylpropane are warmed until melted, and then the butyl parasept, carrageen moss extract and 350 ml. of distilled water are mixed and added slowly with rapid agitation. Distilled water to make 1000 ml. and Fritzsch bouquet, are then added and thoroughly mixed. The resulting lotion is filled into 4 oz. bottles. This composition contains 2% of the active fungicidal agent.

EXAMPLE VII

A suitable fungicidal vaginal suppository consists of:

|                                                  | Percent |
|--------------------------------------------------|---------|
| A. 2-nitro-2-bromo-1-methoxy-1-phenylpropane     | 1       |
| B. Cocoa butter                                  | 89      |
| C. Spermaceti wax                                | 10      |

The ingredients are warmed and stirred until uniform. The melted mixture is poured into suppository molds of 3 gms. capacity.

EXAMPLE VIII

A suitable fungicidal foot powder consists of:

|                                              | Percent |
|----------------------------------------------|---------|
| A. Menthol                                   | .55     |
| B. Phenol                                    | .38     |
| C. Ethanol                                   | 5.0     |
| D. Zinc stearate                             | 30.0    |
| E. 2-nitro-2-bromo-1-methoxy-1-phenylpropane | 1.0     |
| F. Bentonite                                 | 63.07   |

The menthol and phenol are dissolved in the ethyl alcohol and the solution added to the mixture of zinc stearate and bentonite and mixed. The 2-nitro-2-bromo-1-methoxy-1-phenylpropane is added and the entire mixture is then ground into a powder which passes a 200 mesh screen and the powder filled into jars.

The fungicidal efficacy of our new compositions containing the bromo nitro ethers described above has been demonstrated both in vitro and in vivo in human subjects. The results of tests for antifungal activity of 16 of the bromo nitro ethers are set out in Table I below.

The method used to test the antifungal activity of the bromo nitro ethers consisted of preparing plates of Sabouraud's agar with 0.5% malt extract containing 100, 50, 25, 10, 5 and 1 micrograms of the compound tested per ml. of agar, streaking the plates with the test organisms, incubating the streaked plates for 5 days at 25° C., and observing the growth of the organisms tested. Fungi against which all the compounds were tested included *Aspergillus niger*, *Tricophyton mentagrophytes*, and *Candida albicans*. The minimum concentration of the compound which inhibited growth of the fungus is stated in micrograms per milliliter of agar.

Table I

| Bromo Nitro Ether | Min. Inhib. Conc. (mcg./ml. against— | | |
|---|---|---|---|
| | A. niger | Tri. menta | C. albicans |
| 2-Bromo-2-nitro-: | | | |
| 1-methoxy-1-phenylpropane | 20 | 1 | 30 |
| 1-methoxy-1-phenylbutane | 25 | 5 | 50 |
| 1-ethoxy-1-phenylpropane | 25 | 5 | 50 |
| 1-methoxy-1-p-chlorophenylpropane | 100 | 5 | 100 |
| 1-methoxy-1-o,p-dichlorophenylpropane | 25 | 1 | 100 |
| 1-methoxy-1-o,p-dichlorophenylbutane | 50 | 5 | 100 |
| 1-methoxy-1-p-methoxyphenylbutane | 100 | 5 | 100 |
| 1-methoxy-1-p-methoxyphenylpropane | 25 | 1 | 50 |
| 1-methoxy-1-p-chlorophenylpentane | 10 | 10 | 100 |
| 1-methoxy-1-p-chlorophenylpropane | 25 | 1 | 50 |
| 1-ethoxy-1-o-chlorophenylpropane | 25 | 5 | 25 |
| 1-ethoxy-1-o-chlorophenylbutane | 10 | 5 | 100 |
| 1-methoxy-1-o-chlorophenylbutane | 10 | 5 | 100 |
| 1-methoxy-1-p-chlorophenylbutane | 25 | 1 | 100 |
| 1-methoxy-1-m,p-dichlorophenylpropane | 25 | 5 | 50 |
| 1-ethoxy-1-phenylbutane | 1 | 1 | 100 |

The treatment of several groups of patients with our new fungicidal compositions has demonstrated their therapeutic value as fungicides. Clinical studies were conducted on patients presenting glabrous mycotic infections due to *Tricophyton rubrum*, *Tricophyton mentagrophytes*, *Epidermophyton floccosum*, *Microsporum fulvum*, and *Candida* (*monilia*). No infections were treated except those confirmed by culture. Treatment consisted of applying an ointment of the composition of Example I, containing 1% 2-nitro-2-bromo-1-methoxy-1-phenylpropane.

No other treatment was used simultaneously and the presence of secondary infection did not contra-indicate use of the fungicidal ointment. Some of the infections had resisted previous treatment. In no case treated with the fungicidal ointment of Example I was primary irritation observed. In each reported case the treatment with this composition was continued for a sufficient period to allow the development of allergic reactions, but none were noted. The results of treating each species of fungus are summarized in the paragraphs below.

Forty-eight cases of infection with *Tricophyton rubrum* were treated. The chief sites of infection were the feet, crural areas, and the hands. Duration of the infection was from a few weeks to several years and most of the patients had received previous treatment. The shortest treatment period of this group was three weeks and the longest period was thirteen weeks. The plantar and palmar lesions present in some of these cases cleared very slowly. Three patients of this group were not noticeably benefited by the treatment and, in each case, these were patients with either plantar or palmar lesions.

Twenty-one cases of infection with *Tricophyton mentagrophytes* were treated. Most of these infections were subacute and involved the feet, particularly the interdigital spaces. Response to this treatment was prompt and convincing.

The cases of infection with *Epidermophyton floccosum* were treated. All responded promptly.

Two cases of infection with *Microsporum fulvum* were treated. Both responded promptly.

Seven cases of glabrous skin with *Candida* (*monilia*) were treated. Sites of lesions which cleared rapidly included the feet, the crural areas, the inguinal folds, and beneath the breasts. One patient showed infection on the soles as well as between the toes. The interdigital areas cleared satisfactorily, but the plantar lesions remained.

Two groups of patients who showed symmetrical lesions of infection with *Tricophyton rubrum* were treated by "paired comparison." On one group of four patients one side of the body was treated with the fungicidal ointment of Example I and the other side with the ointment base without the 1% active fungicide. This treatment was continued for a few weeks. It became apparent that the areas treated with the fungicidal ointment were improving and those treated with the base only were not. On a second group of three patients infected with the same organism the same procedure was followed except that a diamthazole dihydrochloride ointment was used as the control. In all cases the greatest improvement was noted in the lesions treated with the fungicidal ointment of Example I, containing 1% 2-bromo-2-nitro-1-methoxy-1-phenylpropane.

The results reported above may be summarized by the statement that of the eighty-one cases treated by our new fungicidal composition, sixty-three were regarded as cured, twelve as definitely improved, and four as unimproved. This new composition possesses low toxicity, low irritancy, an apparent low sensitizing index, and a high degree of efficiency in the treatment of mycotic lesions of the glabrous skin. It is of particular value in the treatment of infections caused by *Tricophyton rubrum*.

The toxicity of our new fungicidal compositions to animal skin was determined on the intact skin of rabbits treated daily for from five to seven days. Compositions tested included; the ointment composition of Example I containing 1%, 2%, 5%, and 10% 2-nitro-2-bromo-1-methoxy-1-phenylpropane, the ointment composition of Example II containing 1% 2-nitro-2-bromo-1-methoxy-1-phenylpropane, the ointment composition of Example III containing 1% and 2% 2-nitro-2-bromo-1-methoxy-1-phenylpropane, the dusting powder composition of Example IV containing 1% and 2% 2-nitro-2-bromo-1-methoxy-1-phenylpropane, and the topical lotion composition of Example VI containing 1% and 2% 2-nitro-2-bromo-1-methoxy-1-phenylpropane. None of our new compositions containing 1% of the active fungicidal agent showed significant irritation on rabbit skin and all were judged safe for clinical use. All samples of 2% formulations were judged safe for clinical use. The results of chronic irritation studies are summarized in Table II below.

Table II

CHRONIC IRRITATION OF RABBIT SKIN

[After 7 daily applications of 2-nitro-2-bromo-1-methoxy-1-phenylpropane.]

| Carrier | Concentration, percent | Index of Irrit.[1] | Remarks |
|---|---|---|---|
| Ointment of Example I | 1 | 1.3 | Safe for clinical use. |
| Do | 2 | 1.0 | Do. |
| Do | 5 | 5.3 | Too irrit. for clinical use. |
| Do | 10 | 8.0 | Do. |
| Do (Average 4 lots) | 1 | 0.4 | Safe for clinical use. |
| Ointment of Example II | 1 | 0 | Do. |
| Ointment of Example III | 1 | 0 | Do. |
| Do | 2 | 0 | Do. |
| Lotion of Example VI | 1 | 0 | Do. |
| Do | 2 | 0 | Do. |
| Talcum powder of Example IV | 1 | 0 | Do. |
| Do | 2 | 0 | Do. |
| Foot powder of Example VIII | 1 | 0 | Do. |

[1] Index from 0 to 8.0. Maximum irritation assigned value of 8.0.

Two other compositions were tested for irritation in rabbits. These compositions were the vaginal insufflation powder of Example V containing 1% 2-nitro-2-bromo-1-methoxy-1-phenylpropane, and the vaginal suppository of Example VII containing 1% 2-nitro-2-bromo-1-methoxy-1-phenylpropane. No irritation was observed and both compositions were judged safe for clinical use.

As has been illustrated in the above examples and tables our new fungicidal compositions are safe, effective, therapeutic fungicides, suitable for topical and vaginal use. In concentrations of from 0.1 to 2.0% of the active fungicides our new compositions are non-irritating and can be used for extensive, repeated treatment of persistent fungus infections.

Now having described our invention, what we claim is:

1. A process for alleviating human topical fungal infections which comprises applying to the fungal infection a bromo nitro ether having the general formula

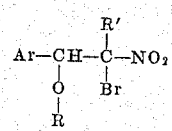

wherein Ar is a member selected from the group consisting of phenyl, chlorophenyl, methoxyphenyl, and dichlorophenyl, and R and R′ are lower alkyl groups in dosage form in a concentration ranging from about 0.1% to about 2.0% in a pharmaceutical carrier.

2. The process of claim 1 wherein the pharmaceutical carrier is a pharmaceutical ointment carrier.

3. The process of claim 1 wherein the pharmaceutical carrier is a pharmaceutical lotion carrier.

4. The process of claim 1 wherein the pharmaceutical carrier is a pharmaceutical insufflation powder.

5. The process of claim 1 wherein the pharmaceutical carrier is a pharmaceutical dusting powder.

6. The process of claim 1 wherein the pharmaceutical carrier is a pharmaceutical suppository.

7. A process for alleviating human topical fungal infections which comprises applying to the fungal infections 2-bromo-2-nitro-1-methoxy-1-phenylpropane in dosage form in a concentration ranging from about 0.1% to about 2.0% in a pharmaceutical carrier.

References Cited in the file of this patent

UNITED STATES PATENTS 2,562,151  Senkus _____ July 24, 1951

OTHER REFERENCES

New and Nonofficial Remedies, 1951, J. P. Lippincott, pgs. XXVII–XXXI.